United States Patent
Shi et al.

(10) Patent No.: US 8,260,065 B2
(45) Date of Patent: Sep. 4, 2012

(54) DATA HIDING WITH WAVELET TRANSFORM HISTOGRAM SHIFTING

(75) Inventors: Yun-Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 1409 days.

(21) Appl. No.: 11/418,821

(22) Filed: May 8, 2006

(65) Prior Publication Data
US 2008/0002851 A1   Jan. 3, 2008

(51) Int. Cl.
*G06K 9/36* (2006.01)
(52) U.S. Cl. ........................... 382/232; 382/100
(58) Field of Classification Search ............... 382/100; 358/426.01, 426.16
See application file for complete search history.

(56) References Cited

U.S. PATENT DOCUMENTS

| | | | |
|---|---|---|---|
| 6,873,711 B1* | 3/2005 | Murakami et al. | 382/100 |
| 2006/0083403 A1* | 4/2006 | Zhang et al. | 382/100 |

OTHER PUBLICATIONS

Xuan et al "Distortionless Data Hiding Based on Integer Wavelet Transform", IEEE Journal, Electronics Letters, vol. 38, No. 25, pp. 1646-1648, Dec. 2002.*
Yuan et al, "Fragile watermark based on the Gaussian mixture model in the wavelet domain for image authentication", Proc. International Conference on Image processing, 2003.*
Liu et al, "Content Based Color Image Adaptive Watermarking Scheme", 2001 IEEE international Symposium Circuits and System, pp. 41-44, May 2001.*

* cited by examiner

*Primary Examiner* — Samir Ahmed
(74) *Attorney, Agent, or Firm* — Connolly Bove Lodge & Hutz LLP

(57) ABSTRACT

Embodiments related to data hiding using wavelet transforms and histogram shifting are disclosed.

60 Claims, 11 Drawing Sheets

US 8,260,065 B2

DATA HIDING WITH WAVELET TRANSFORM HISTOGRAM SHIFTING

FIELD

This application pertains to the field of embedding data in and/or extracting data from a digital format image.

BACKGROUND

It is often desirable to embed various data in an image, audio, or video file. In some instances, the embedded data may comprise a digital watermark. A digital watermark may comprise a pattern of bits inserted into a digital image, audio, or video file. The watermark may comprise copyright information, such as author, rights, etc. The watermark may serve to provide copy protection for intellectual property that is in a digital format. Unlike printed watermarks, for example imprinted on stationary, digital watermarks may be designed to be as invisible as practicable, or in the case of an audio file as inaudible as practicable. Watermarks are merely one example of data that may be embedded in a digital object.

BRIEF DESCRIPTION OF THE DRAWINGS

The claimed subject matter will be understood more fully from the detailed description given below and from the accompanying drawings of embodiments which should not be taken to limit the claimed subject matter to the specific embodiments described, but are for explanation and understanding only.

FIG. 3b is a diagram depicting an example result of a histogram modification operation performed on the example histogram of FIG. 3a.

DETAILED DESCRIPTION

Figure 1:
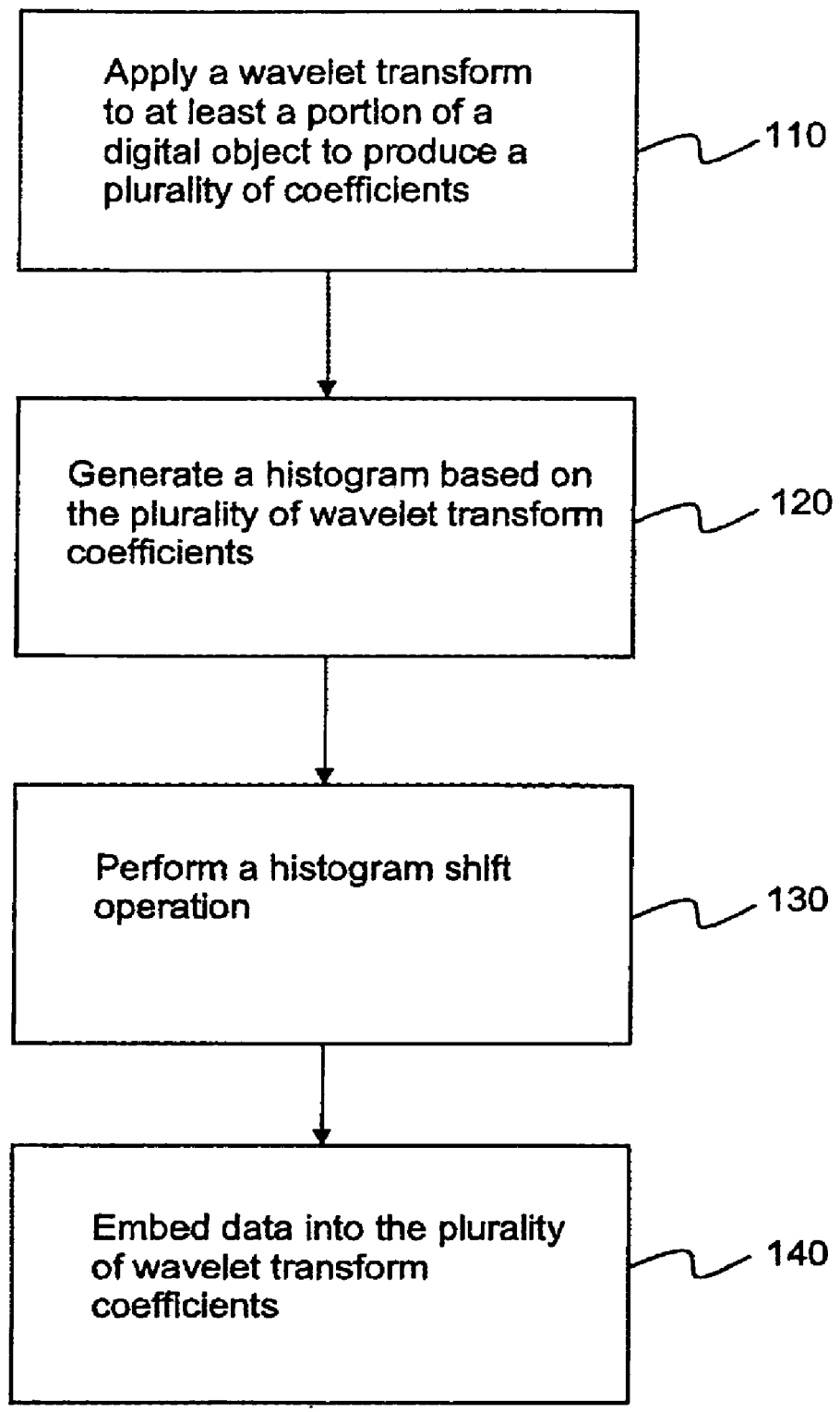
FIG. 1 is a flow diagram of one embodiment of a method for data hiding using wavelet transform and histogram shifting.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

A process and/or algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

A digital object as referred to herein may relate to information that is organized and/or formatted in a digitized form. For example, a digital object may comprise one or more documents, visual media and/or audio media, and/or combinations thereof. A digital object may comprise a digital image, or may comprise an audio file, for example. A digital object may also comprise a digital video file. However, these are merely examples of the types of information that may be maintained in a digital object, and the scope of the claimed subject matter is not limited in this respect. Such a digital object may be maintained in a compressed format to enable efficient storage of the digital object in a storage medium and/or transmission of the digital in a data transmission network. In other embodiments, such a digital object may be encrypted for transmission in a secure communication channel.

Although the embodiments described herein make use of digital images, other embodiments are possible using other digital object types, such as, for example, an audio file. Further, a digital image may, for some embodiments, comprise a frame of a digital video signal. The image may comprise a still image (or intra-frame), a motion-compensated residual image (Displaced Frame Difference (DFD) image, or inter-frame), or other type of image. A digital image may for some embodiments comprise a number of planes, where each plane may comprise a two-dimensional array of pixel data. For one example, a digital image may comprise a luminance plane as well as one or more color planes. For another example, a digital image may comprise red, green, and blue planes. However, these are merely examples of digital object types, and the scope of the claimed subject matter is not limited in these respects.

As previously mentioned, it is often desirable to embed data within an image, perhaps to mark the image with copyright and/or other security and/or other digital rights management information. Such information may be termed a digital watermark. Embodiments described herein may provide lossless image data hiding. Embodiments described herein may provide for correct retrieval of hidden data and may also be capable of restoring a marked image back to its original image state without visible distortion artifacts. As previously mentioned, a watermark is merely an example of data that may be embedded (hidden) in a digital object, and the scope of the claimed subject matter is not limited in this respect.

For one embodiment, lossless data hiding may be accomplished using histogram shifting operations in integer wavelet transform domain. For one embodiment, data may be hidden along with wavelet coefficients of a higher frequency sub-band. Part of a wavelet histogram for such a higher frequency sub-band may be shifted and data may be embedded using a zero-point created by the shift operation. Histogram modification operations may be performed prior to data embedding in order to guard against overflow (for example, a pixel grayscale value exceeding 255 for an 8-bit image) and/or underflow (for example, the pixel value falls below 0 for an 8-bit image) conditions. Any of a range of histogram modification operations may be utilized. Some embodiments are possible where histogram modification operations are not used. For embodiments where histogram modification operations are used to guard against overflow and/or underflow conditions, parameters describing the histogram modification operation may be embedded in the marked image to allow for lossless or nearly lossless image reconstruction. Other of the various data hiding operations are discussed more completely below.

For some embodiments, an image may be represented as a two-dimensional array of coefficients, where the coefficients may represent luminance levels at a point. Many images have smooth luminance variations, with the fine details being represented as sharp edges in between the smooth variations. The smooth variations in luminance may be termed as lower frequency components and the sharp variations as higher frequency components. The lower frequency components (smooth variations) may comprise the gross information for an image, and the higher frequency components may include information to add detail to the gross information. One technique for separating the lower frequency components from the higher frequency components may include an Integer Wavelet Transform (IWT). Wavelet transforms may be used to decompose images. Wavelet decomposition may include the application of Finite Impulse Response (FIR) filters to separate image data into sub sampled frequency bands. The application of the FIR filters may occur in an iterative fashion, for example as described below in connection with FIGS. 3a through 3c. For one embodiment, a Cohen-Daubechies-Feauveau (CDF) (2,2) wavelet transform may be utilized, although the scope of the claimed subject matter is not limited in this respect. Any of a wide range of wavelet transforms may be utilized in accordance with claimed subject matter.

Figure 4A:
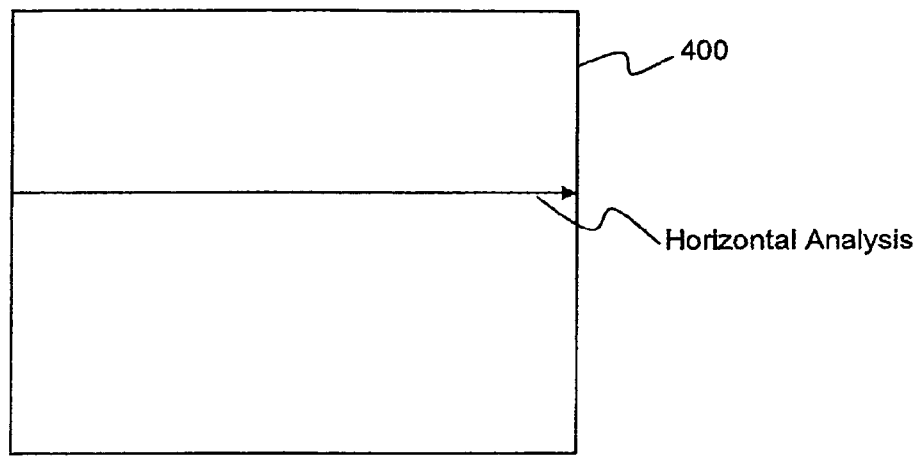
FIG. 4a is a diagram depicting an example decomposition of an image in a horizontal direction.

FIG. 1 is a flow diagram of an example embodiment of a method for embedding data, perhaps digital watermark information, within an image. At block 110, a wavelet transform may be applied to at least a portion of a digital image. The wavelet transform may produce a plurality of wavelet coefficients. At block 120, a histogram may be produced based on the plurality of wavelet coefficients. For one embodiment, a histogram may comprise coefficient values in one dimension and may further comprise the occurrence numbers for each of the coefficient values in another dimension. However, this is merely one example of a histogram, and the scope of the claimed subject matter is not limited in this respect. FIG. 4a below depicts a simplified example histogram. At block 130, a shift operation may be performed on the wavelet histogram. Wavelet histogram shift operations are discussed more fully below. At block 140, data may be embedded into the plurality of wavelet transform coefficients. Embodiments in accordance with claimed subject matter may include all, more than all, and/or less than all of blocks 110-140, and furthermore the order of blocks 110-140 is merely an example order, and the scope of the claimed subject matter is not limited in this respect.

Figure 2:
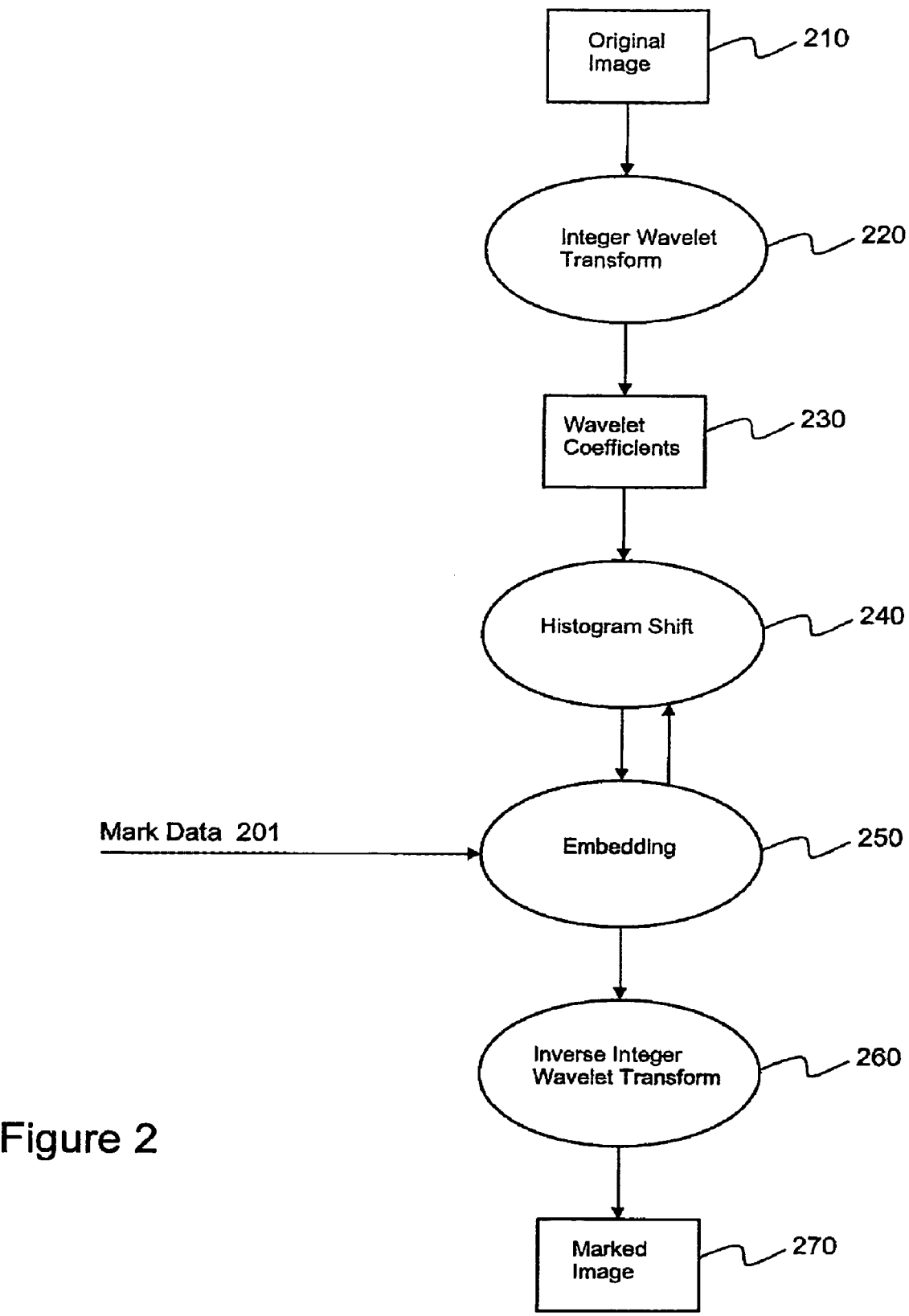
FIG. 2 is a block diagram depicting an example embodiment capable of hiding data using wavelet transform and histogram shifting.

FIG. 2 is a block diagram depicting an example embodiment capable of hiding data using wavelet transform and histogram shifting. Embodiments in accordance with claimed subject matter may be implemented in hardware, firmware, and/or software, or any combination of hardware, firmware, and/or software. Block 210 for this example depicts an original digital image. Block 220 may comprise an integer wavelet transform unit. Block 230 depicts a plurality of wavelet coefficients generated by the integer wavelet transform. Block 240 for this example may comprise a histogram generator and/or histogram shift unit. A data embedding unit is depicted at block 250. Embedding unit 250 may receive mark data 201. Mark data may comprise digital watermark information or any other data, including but not limited to histogram modification information and/or an encryption key. Units 240 and 250 may operate in concert one with the other to embed data into the image in a lossless and efficient manner. Although the embodiments described herein mention lossless data hiding, other embodiments are possible where near-lossless and/or lossy data hiding are utilized. Block 260 for this embodiment may comprise an inverse integer wavelet transform unit. Unit 260 may generate a marked image, labeled 270 for this example. Although the example embodiment depicted in FIG. 2 is described with a particular configuration of operations and/or units, the scope of the claimed subject matter is not so limited, and a wide range of other configurations are possible.

Figure 3A:
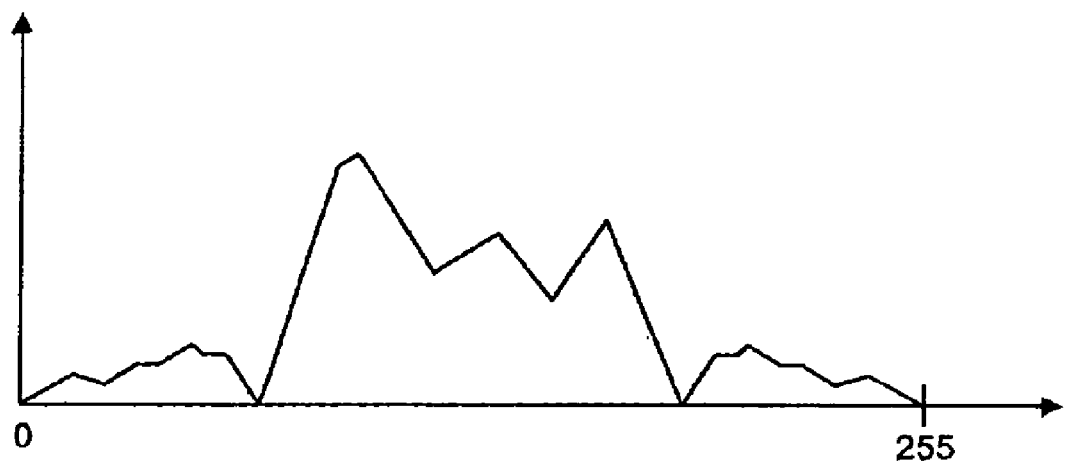
FIG. 3a is a diagram depicting a simplified histogram for image data.

FIG. 3a is a diagram depicting a simplified histogram for image data. This example may comprise a histogram corresponding to an 8-bit grayscale image having a maximum pixel value of 255 and a minimum pixel value of 0. For this example, the histogram comprises pixel values ranging from 0 to 255. As mentioned above, it is possible that upon applying an integer wavelet transform and embedding data, overflow and/or underflow conditions may occur. Histogram modification operations may be performed prior to data embedding in order to guard against overflow and/or underflow conditions. Any of a range of histogram modification operations may be utilized. Some embodiments are possible where histogram modification operations are not used. For embodiments where histogram modification operations are used to guard against overflow and/or underflow conditions, parameters describing the histogram modification operation may be embedded in the marked image to allow for lossless or nearly lossless image reconstruction.

Figure 3B:
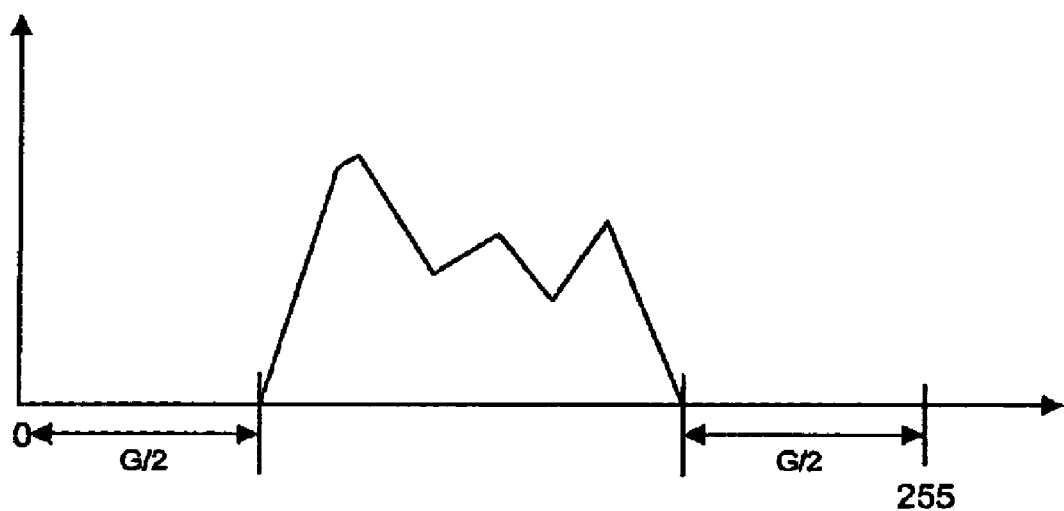

FIG. 3b is a diagram depicting an example result of one possible histogram modification operation performed on the example histogram of FIG. 3a. For this example, the histogram may be narrowed from both ends of the histogram. For this example, the histogram may be narrowed to a range of [0+G/2:255-G/2] where the variable G is selected to provide an appropriate amount of narrowing. As previously mentioned, parameters describing the histogram modification operation and/or other information may be embedded in the marked image to allow for lossless or nearly lossless image reconstruction. The embedded information may comprise the variable G as well as information describing the regions. [0:G/2] and [255-G/2:255] in perhaps a compressed format. The histogram modification operation depicted in FIG. 3b is merely one example of a histogram modification operation, and the scope of the claimed subject matter is not limited in this respect.

Figure 4B:
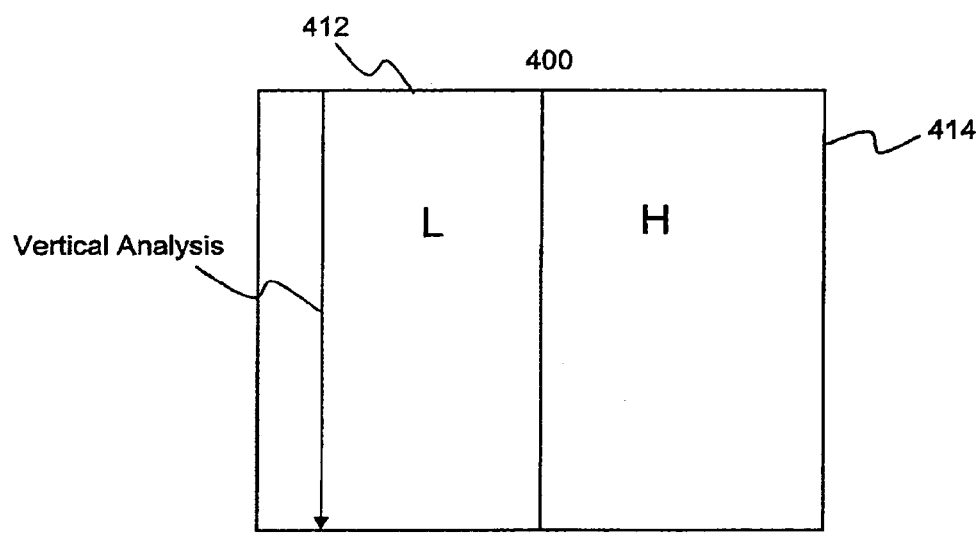
FIG. 4b is a diagram depicting an image that has been decomposed in a horizontal direction and is undergoing decomposition in a vertical direction.
Figure 4C:
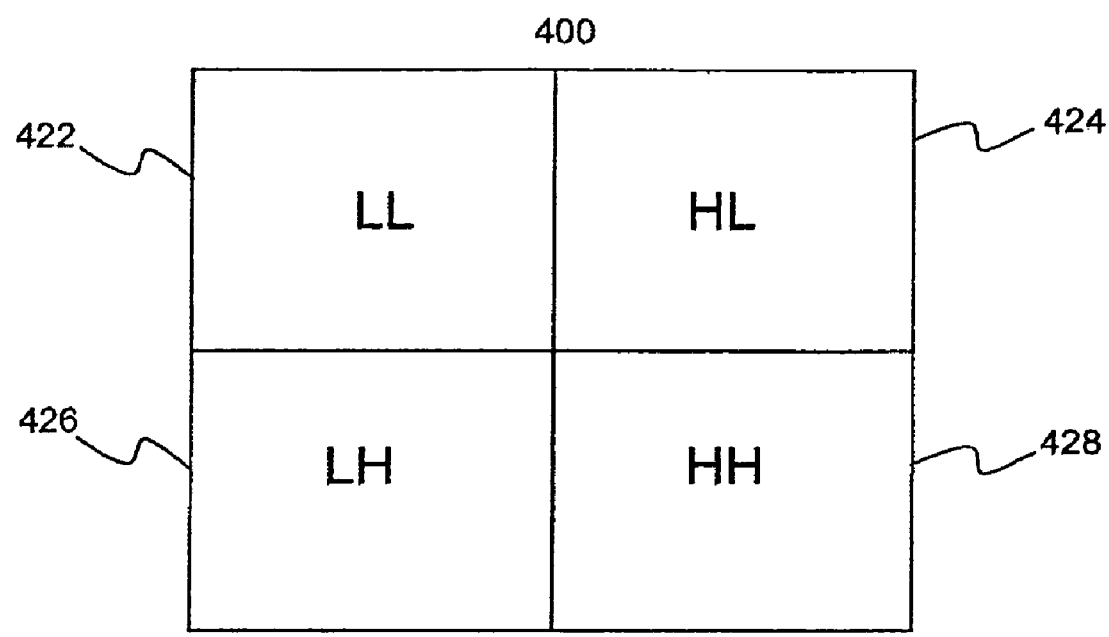
FIG. 4c is a diagram depicting an image that has been decomposed into four frequency sub-bands.

FIGS. 4a through 4c are diagrams depicting an example wavelet decomposition of an image 400. As depicted in FIG. 4a, for this example embodiment, the analysis may begin in a horizontal direction. Other embodiments may begin the analysis in a vertical direction, or in another direction. The horizontal analysis may result in the image data being subdivided into two sub-bands. The resulting low pass band (containing lower frequency image information) is depicted as area 412 in FIG. 4b and the high pass sub-band (containing higher frequency image information) is depicted as area 414. Also as depicted in FIG. 4b, an analysis is performed in a vertical direction on image 400.

FIG. 4c shows the results of the horizontal and vertical analyses. Image 400 may be divided into four sub-bands. LL sub-band 422 may comprise data that has been low passed filtered in both the horizontal and vertical directions. HL sub-band 424 may comprise data that has been high pass filtered in the horizontal direction and low pass filtered in the vertical direction. LH sub-band 426 may comprise data that has been low pass filtered in the horizontal direction and high pass filtered in the vertical direction. HH sub-band 428 may comprise data that has been high pass filtered in both the horizontal and vertical directions. LL sub-band 422 may comprise gross image information, and bands HL 424, LH 426, and HH 428 may comprise high frequency information providing additional image detail.

For some embodiments, data may be embedded in higher-frequency sub-bands. For example, data may be embedded in the sub-bands 428, 424, and 426, perhaps in that order of preference, although the scope of the claimed subject matter is not limited in this respect.

Figure 5A:
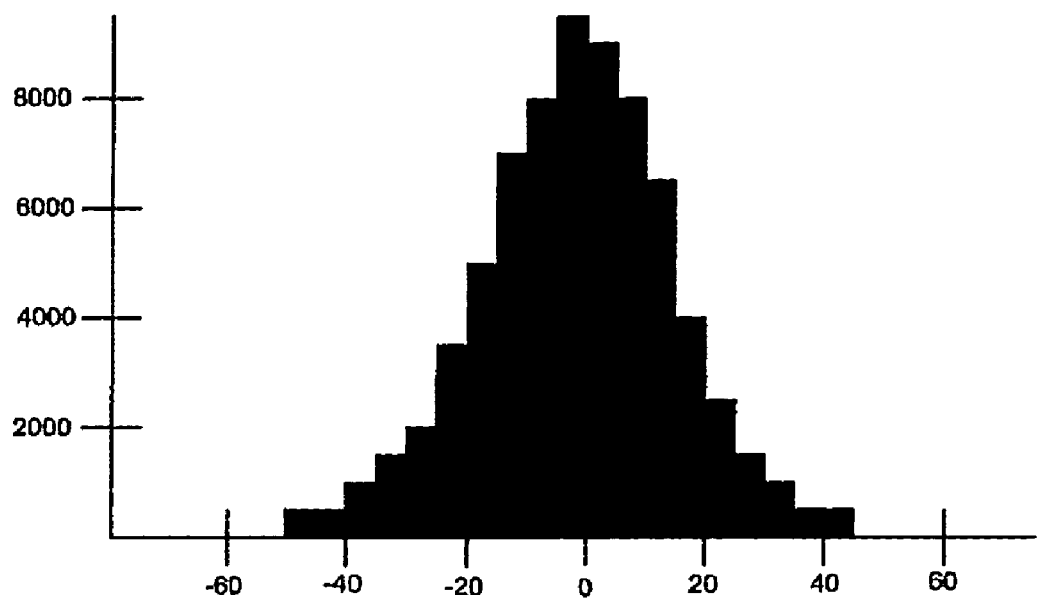
FIG. 5a depicts an example wavelet transform histogram.

FIG. 5a depicts a simplified example wavelet histogram corresponding to a sub-band. For this example, the numbers along the horizontal axis may comprise wavelet transform coefficient values and the numbers along the vertical axis may comprise values representing the number of occurrences in the sub-band for each of the wavelet transform coefficients.

Figure 5B:
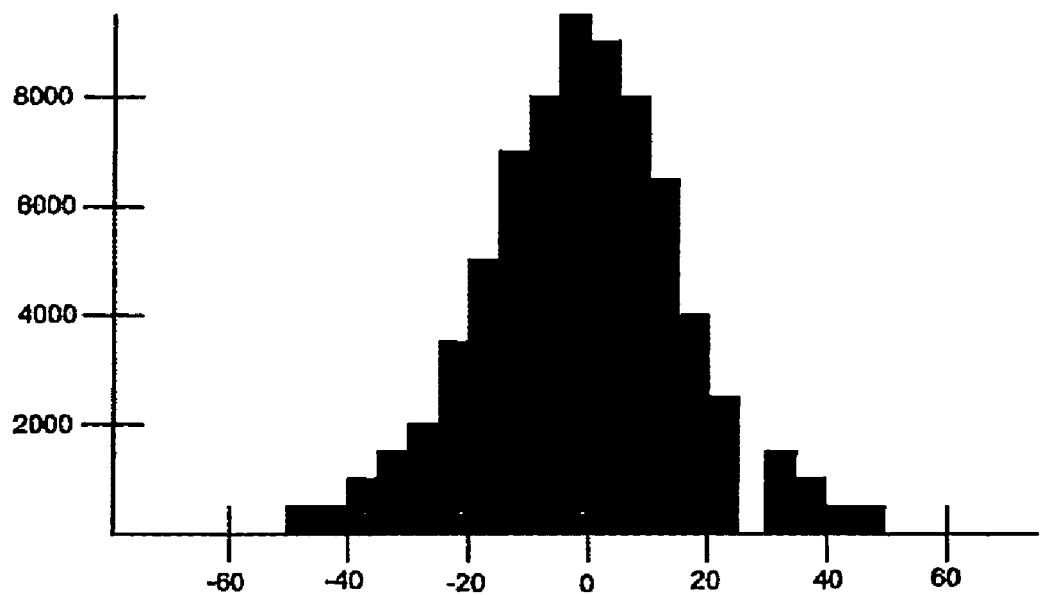
FIG. 5b depicts an example wavelet transform histogram with a zero-point created by a shift operation.

FIG. 5b depicts a simplified example wavelet histogram corresponding to the sub-band with a gap created to produce a zero-point. The zero-point may be created by shifting a portion of the histogram depicted in FIG. 5a. The term "zero-point" as used herein is meant to denote a coefficient value with an occurrence value of zero. That is, there are no instances of the wavelet coefficient value corresponding to the zero-point in the sub-band. For this example, a zero-point may be created by shifting all of the values in the histogram greater than a selected index value to the right by one. So, for an coefficient index value Z, the original occurrence value for coefficient Z+1 becomes the new occurrence value for coefficient Z+2, the original occurrence value for coefficient Z+2 becomes the new occurrence value for coefficient Z+3, and so on. Coefficient Z+1 after the shifting has an occurrence value of zero, and may therefore be referred to as a zero-point. The portion of the histogram with coefficient values of less than Z+1 remains unchanged for this example.

For an embodiment, in order to embed data, all of the wavelet coefficients in the sub-band may be scanned. If a wavelet coefficient with a value of "Z" is encountered, and if a next data bit to be embedded has a value of "1", this coefficient's value is incremented by one to a new value of Z+1. The wavelet histogram occurrence value for coefficient Z+1 may be incremented as well. If when a wavelet coefficient with the value of "Z" is encounter the next data bit to be embedded has a value of "0", this coefficient's value is not incremented.

For data extraction, a scan may be performed for all wavelet coefficients in the sub-band. If a wavelet coefficient with a value of "Z" is encountered, a data bit with the value "0" is extracted. Data bits with the value "1" may be extracted when wavelet coefficients with the value "Z+1" are encountered. Also, the coefficients with a value "Z+1" are reduced back to the original value of "Z". In response to reducing "Z+1" to "Z" for a coefficient, the occurrence value for coefficient Z+1 may be reduced. When all embedded (hidden) bits have been extracted out, the portion of the histogram with coefficient values larger than Z+1 may be shifted back to backfill the zero-point and return the histogram to its original condition.

For some embodiments, because histograms of wavelet transform high frequency sub-bands typically obey Laplacian-like distribution, data may be embedded in both sides of the histogram in an alternate manner until all of the data bits have been embedded.

Figure 6:
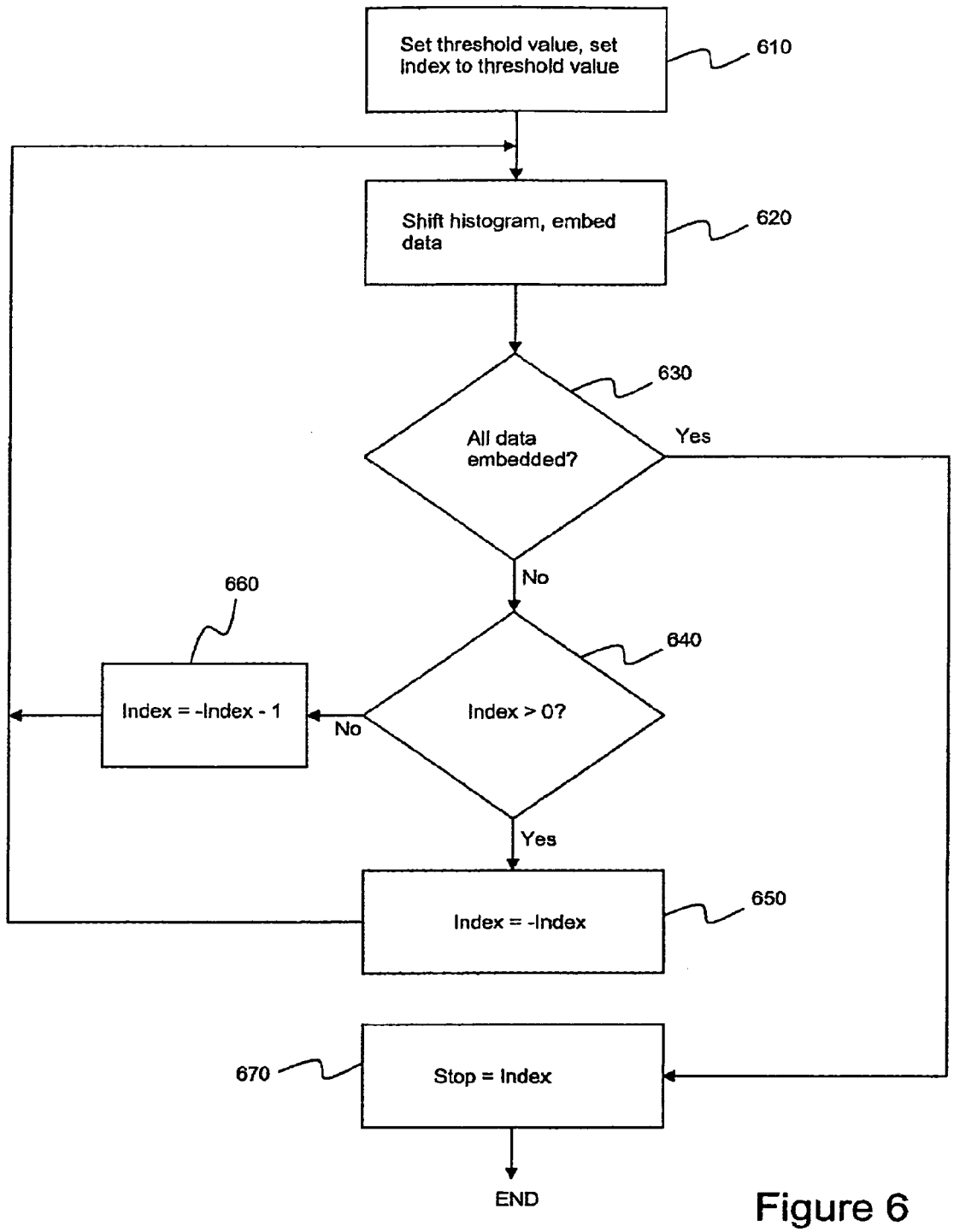
FIG. 6 is a flow chart of an example embodiment of a method for embedding data.

FIG. 6 is a flow diagram of an example embodiment for embedding data in both sides of a histogram. At block 610, a threshold value T is set, and an index value is set to equal the threshold value. The selection of the threshold value may depend on a number of factors, including, but not limited to, the amount of data to be embedded and/or the desired visual fidelity (perhaps measured by peak signal-to-noise ration (PSNR)). For this example embodiment, T may be greater than zero. T may also be chosen such that the number of wavelet coefficients in the range [−T:T] is greater than the number of bits to be embedded.

At block 620, the portion of the histogram having coefficient values greater than the index value are shifted to create a zero-point at index+1. Data may be embedded at this point according to the algorithm described above. Block 630 indicates that if there are no further data bits to be embedded, a stop value is set to equal the current index value. However, if there remains further data bits to embed, at block 640 a determination is made as to whether the current index value is greater than one. If index is greater than one, at block 650 the value index is set to equal "−index". If at block 640 index is not greater than zero, at block 660 index is set to equal. "−index−1" and processing returns to block 620. For this time through the algorithm, a zero-point may be created at the left side of the histogram. If at block 630 it is determined that all of the data have been embedded, then at block 670 the value Stop is set to equal the current index value. The stop value may provide a starting point for data extraction operations, described below.

If there are data left to be embedded when Stop equals zero, the range [−T, T] may not be wide enough. The threshold value T may be increased. For some payloads, different T values may lead to different Stop values and/or PSNR. Table 1 shows that if 0.02 bits per pixel of data are embedded into an example hypothetical image, the highest PSNR may be achieved when T=3. Of course, this is merely an example threshold value and the scope of the claimed subject matter is not limited in this response.

TABLE 2

Threshold T on stop position S and PSNR

| Threshold T | Stop value S | PSNR |
|---|---|---|
| T = 0 | 0 | 55.80 |
| T = 1 | 1 | 56.32 |
| T = 2 | 2 | 56.73 |
| T = 3 | 3 | 56.90 |
| T = 4 | 4 | 56.75 |
| T = 5 | 5 | 56.33 |

Embodiments in accordance with claimed subject matter may include all, more than all, and/or less than all of blocks 610-670, and furthermore the order of blocks 610-670 is merely an example order, and the scope of the claimed subject matter is not limited in this respect.

Figure 7:
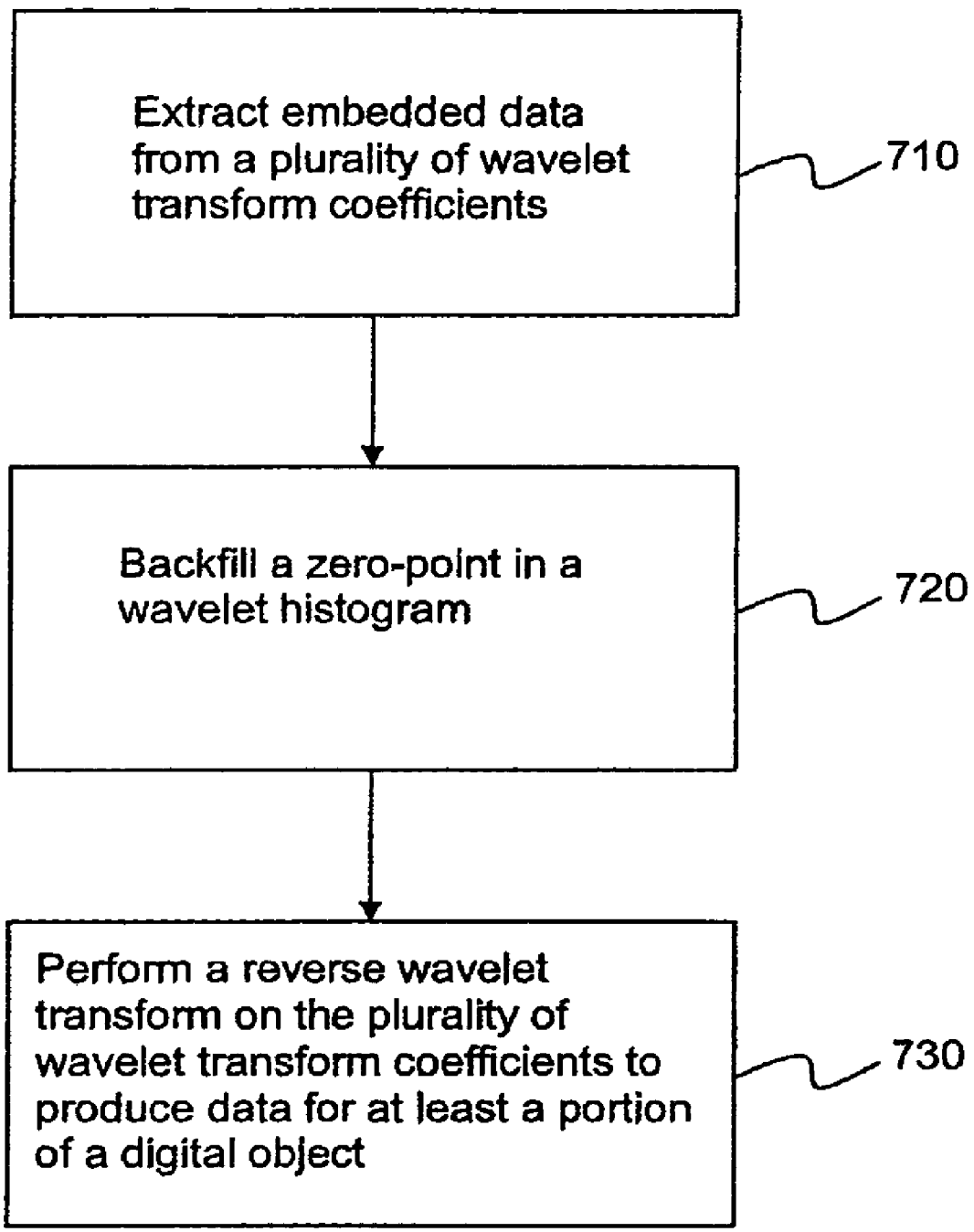
FIG. 7 is a flow diagram of one embodiment of a method for extracting data hidden using wavelet transform and histogram shifting.

FIG. 7 is a flow diagram of an example embodiment of a method for extracting hidden data. At block 710, embedded data is extracted from a plurality of wavelet transform coefficients. At block 720, a zero-point in a wavelet histogram may be backfilled. At block 730, a reverse wavelet transform may be performed on the plurality of wavelet transform coefficients in order to produce data for at least a portion of a digital object. Embodiments in accordance with claimed subject matter may include all, more than all, and/or less than all of blocks 710-730, and furthermore the order of blocks 710-730 is merely an example order, and the scope of the claimed subject matter is not limited in this respect.

Figure 8:
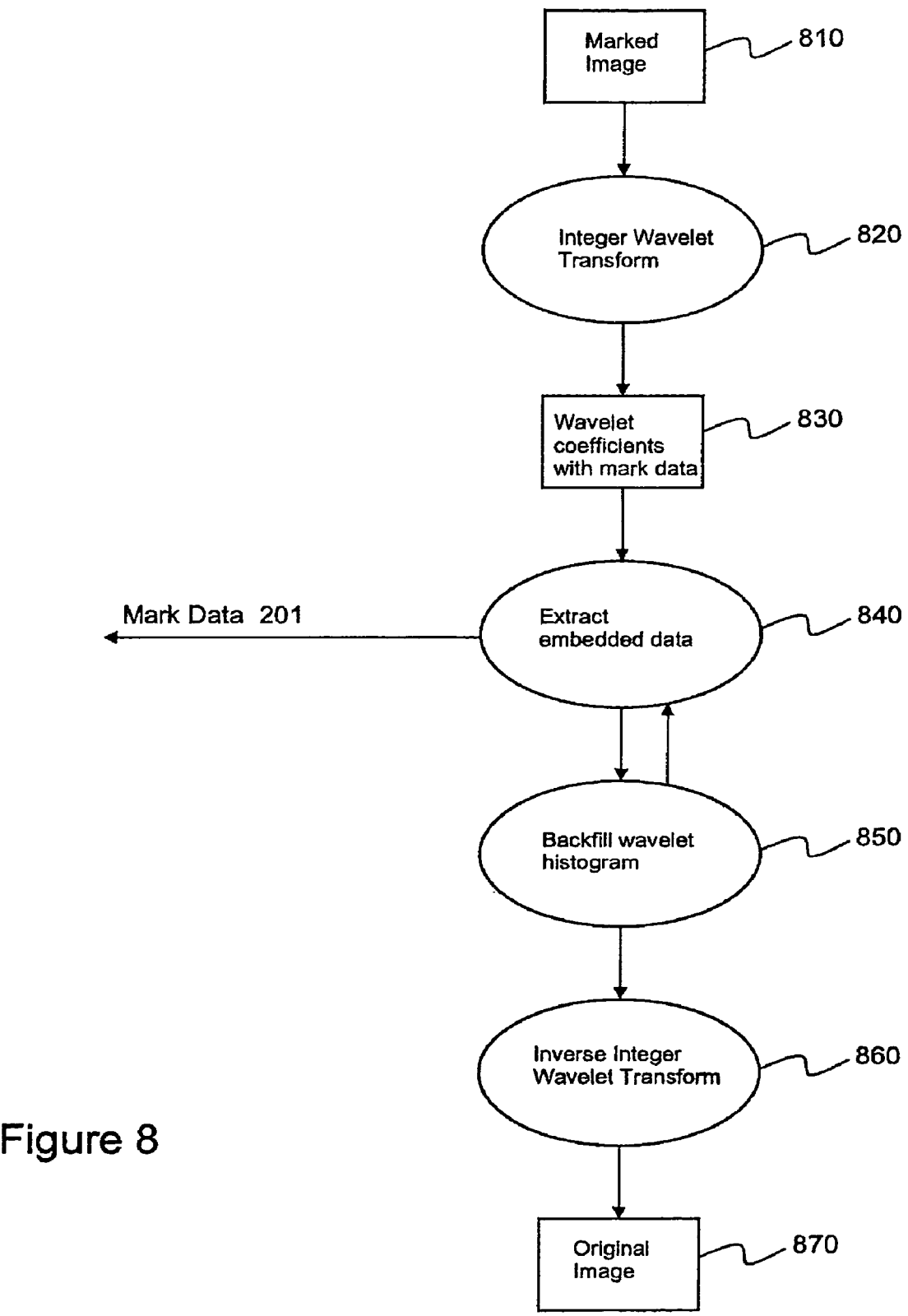
FIG. 8 is a block diagram depicting an example embodiment capable of extracting hidden data.

FIG. 8 is a block diagram depicting an example embodiment capable of extracting hidden data using wavelet transform and histogram shifting. Embodiments in accordance with claimed subject matter may be implemented in hardware, firmware, and/or software, or any combination of hardware, firmware, and/or software. Block 810 for this example depicts a marked image. Block 820 may comprise an integer Wavelet transform unit. Block 830 depicts a plurality of wavelet coefficients generated by the integer wavelet transform. The wavelet coefficients may include embedded data. Block 840 for this example may comprise an embedded data extractor. A histogram backfill (shift) unit is depicted at block 850. Extracting unit 840 may provide mark data 201. As discussed above, mark data may comprise digital watermark information or any other data, including but not limited to histogram modification parameters and/or an encryption key. Units 840 and 850 may operate in concert one with the other to extract embedded data from an image in a lossless and efficient manner. Block 860 for this embodiment may comprise an inverse integer wavelet transform unit. Unit 860 may generate an image that is a lossless copy of an original, labeled 870 for this example. Although the example embodiment depicted in FIG. 8 is described with a particular configuration of operations and/or units, the scope of the claimed subject matter is not so limited, and a wide range of other configurations are possible.

Figure 9:
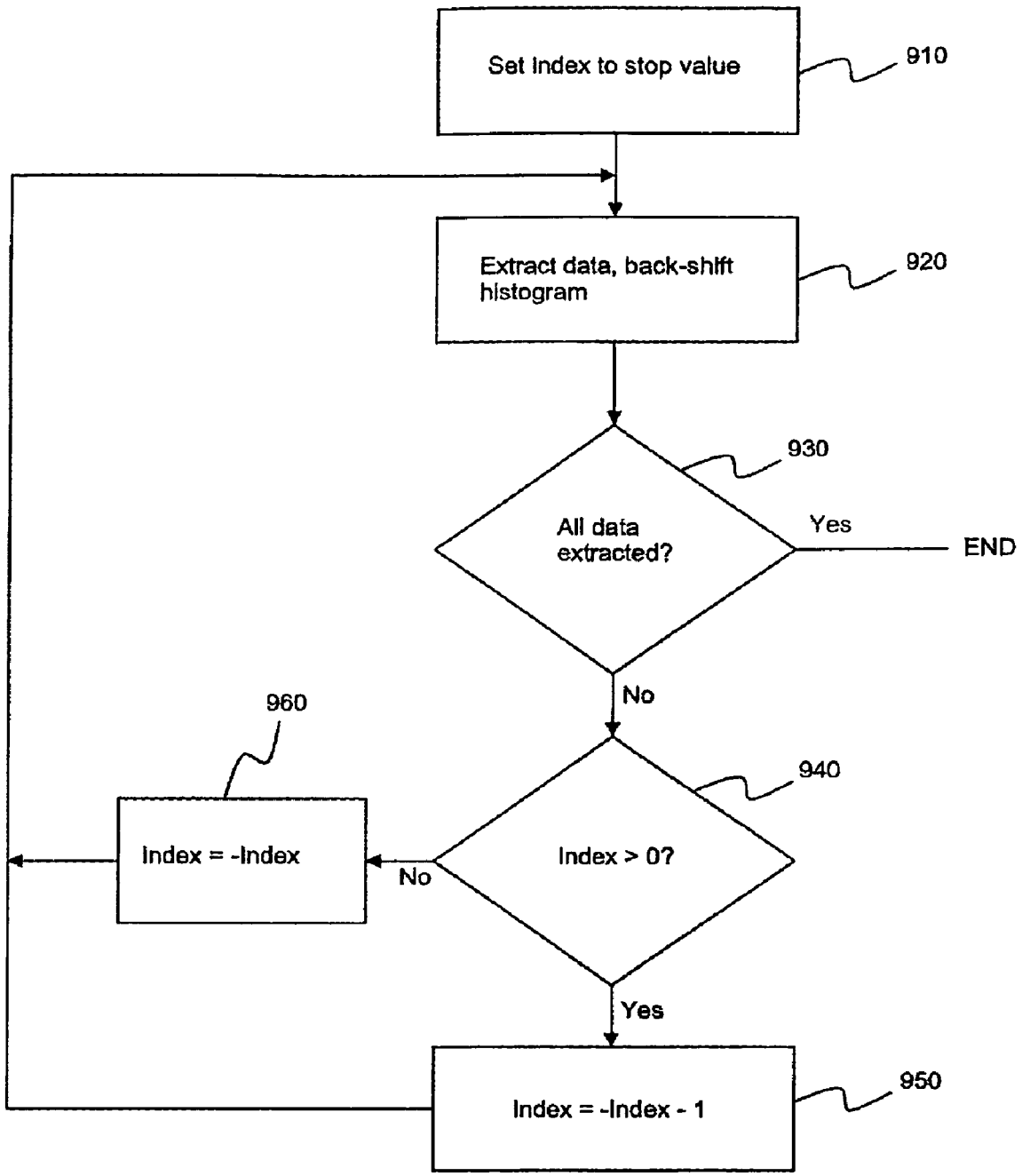
FIG. 9 is a flow chart of an example embodiment of a method for extracting data.

FIG. 9 is a flow diagram of an example embodiment of a method for extracting data. At block 910, an index value is set to a stop value provided by the embedding operation discussed above. At block 920, data is extracted and the gap at the zero-point is closed by shifting the histogram back to its original position. At block 930, a determination is made as to whether all embedded data has been extracted. If all embedded data has been extracted, processing ends. If, however, all embedded data has not been extracted, a determination is made at block 940 as to whether the current index value is greater than zero. If the current index value is greater than zero, the index value may be set to equal "−index−1". Otherwise, index is set to "−index" and processing returns to block 920. Embodiments in accordance with claimed subject matter may include all, more than all, and/or less than all of blocks 910-960, and furthermore the order of blocks 910-960 is merely an example order, and the scope of the claimed subject matter is not limited in this respect.

Figure 10:
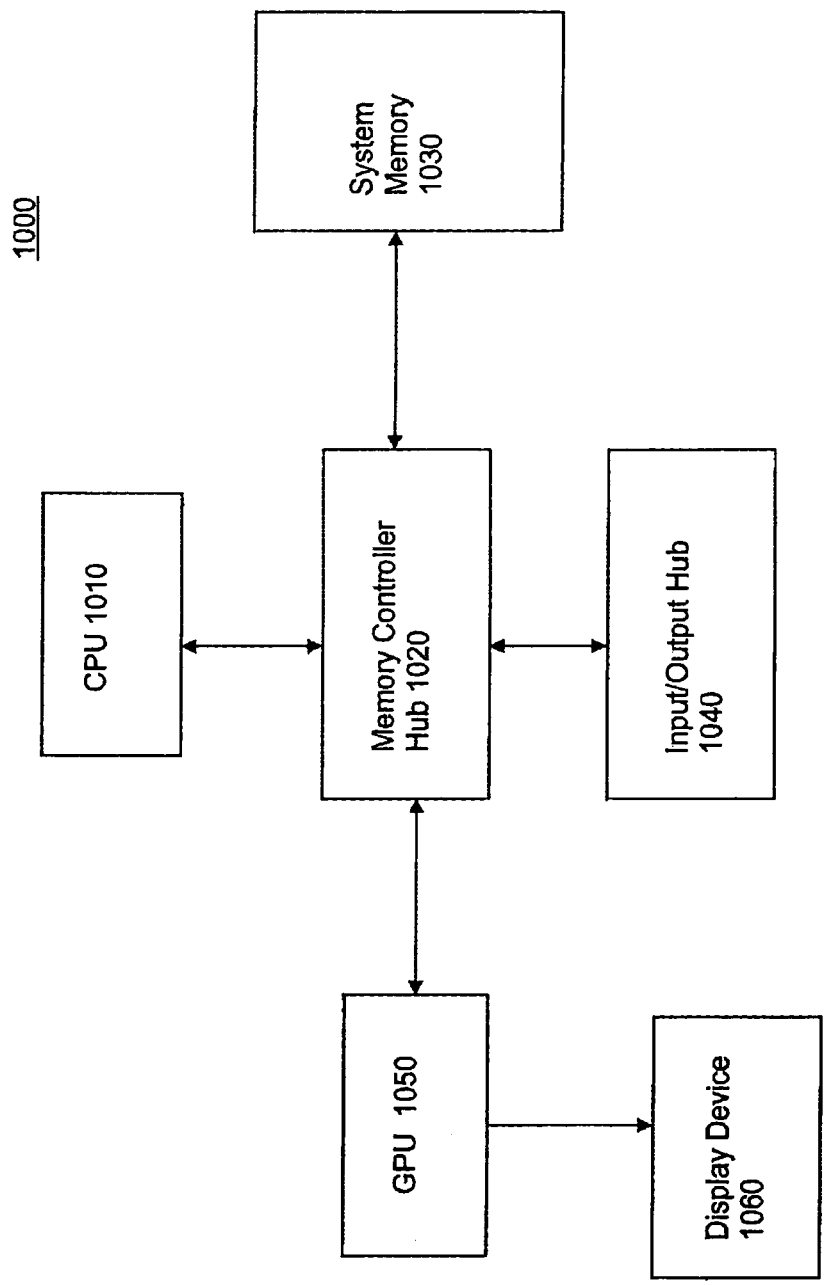
FIG. 10 is a block diagram of one embodiment of an example computing platform.

FIG. 10 is a block diagram of an example computing platform 1000. System 1000 may be used to perform some or all of the various functions discussed above in connection with FIGS. 1-9. Platform 1000 may comprise a central processing unit (CPU) 1010 and a memory controller hub 1020 coupled to CPU 1010. Memory controller hub 1020 is further coupled to a system memory 1030, to a graphics processing unit (GPU) 1050, and to an input/output hub 1040. GPU 1050 is further coupled to a display device 1060, which may comprise a CRT display, a flat panel LCD display, or other type of display device. Although example platform 1000 is shown with a particular configuration of components, other embodiments are possible using any of a wide range of configurations. The term "computing platform" as used herein is meant to include any electronic device capable of executing instructions.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, comprising:
applying a wavelet transform to at least a portion of a digital object to produce a plurality of wavelet transform coefficients;
generating digital information indicative of a histogram of occurrences of values based on the plurality of wavelet transform coefficients;
performing a histogram shift operation of the occurrences of at least a first contiguous plurality of the values of the histogram indicative digital information without performing a histogram shift operation of the occurrences of at least a second contiguous plurality of the values of the histogram indicative digital information, wherein each of the coefficient values of the at least a first contiguous plurality are less than each of the coefficient values of the at least a second contiguous plurality; and
embedding data into the plurality of wavelet transform coefficients using a computing platform.

2. The method of claim 1, wherein applying a wavelet transform to at least a portion of a digital object comprises applying a wavelet transform to at least a portion of a digital image.

3. The method of claim 2, wherein applying a wavelet transform to at least a portion of the digital image comprises applying a two-dimensional wavelet transform to the at least a portion of the digital image.

4. The method of claim 3, wherein applying a two-dimensional wavelet transform to at least a portion of the digital image comprises applying the two-dimensional wavelet transform to a plane of the digital image.

5. The method of claim 4, wherein the plane of the digital image comprises a luminosity plane.

6. The method of claim 4, wherein the plane of the digital image comprises a red, green, or blue color plane.

7. The method of claim 2, wherein the digital image comprises a frame of a digital video file.

8. The method of claim 1, wherein the digital object comprises an audio file.

9. The method of claim 1, wherein applying a wavelet transform to at least a portion of a digital object comprises applying an integer wavelet transform.

10. The method of claim 9, wherein applying an integer wavelet transform comprises applying a Cohen-Daubechies-Feauveau (2,2) wavelet transform.

11. The method of claim 1, further comprising performing a histogram narrowing operation.

12. A method comprising:
applying a wavelet transform to at least a portion of a digital object to produce a plurality of wavelet transform coefficients;
generating digital information indicative of a histogram of occurrences of values based on the plurality of wavelet transform coefficients;
performing a histogram shift operation of the occurrences of at least a first contiguous plurality of the values of the histogram indicative digital information without performing a histogram shift operation of the occurrences of at least a second contiguous plurality of the values of the histogram indicative digital information; and
embedding data into the plurality of wavelet transform coefficients using a computing platform, wherein embedding data into the plurality of wavelet transform coefficients comprises:
scanning the plurality of transform coefficients; and for each coefficient having a coefficient value equal to a value associated with a coefficient adjacent to a coefficient with an occurrence value of zero in the histogram, if a data bit to be embedded comprises a "1", increasing the coefficient value by one.

13. The method of claim 12, wherein for each coefficient having a coefficient value equal to the value associated with the coefficient adjacent to the coefficient with an occurrence value of zero in the histogram, if a data bit to be embedded comprises a "0", the coefficient value is not increased.

14. A method, comprising:
extracting embedded data from a plurality of wavelet transform coefficients;
backfilling a gap in a wavelet histogram, wherein the gap is created by performing a histogram shift operation of occurrences of at least a first contiguous plurality of the values of the histogram indicative digital information without performing a histogram shift operation of the occurrences of at least a second contiguous plurality of the values of the histogram indicative digital information, and wherein each of the coefficient values of the at least a first contiguous plurality are less than each of the coefficient values of the at least a second contiguous plurality; and
performing a reverse wavelet transform on the plurality of wavelet transform coefficients using a computing platform to produce data for at least a portion of a digital object.

15. The method of claim 14, wherein the digital object comprises a digital image.

16. The method of claim 15, wherein the digital image comprises a frame of a digital video file.

17. The method of claim 14, wherein the at least a portion of a digital object comprises a plane of a digital image.

18. The method of claim 14, wherein the digital object comprises an audio file.

19. The method of claim 14, wherein performing an inverse wavelet transform comprises performing an inverse Cohen-Daubechies-Feauveau (2,2) wavelet transform.

20. A method comprising:
extracting embedded data from a plurality of wavelet transform coefficients;
backfilling a gap in a wavelet histogram; and
performing a reverse wavelet transform on the plurality of wavelet transform coefficients using a computing platform to produce data for at least a portion of a digital object,
wherein extracting embedded data from the plurality of wavelet transform coefficients comprises:
decoding a bit with a value of zero for a coefficient having a coefficient value equal to a value associated with a coefficient with an occurrence value of zero in the histogram; and
decoding a bit with a value of one for a coefficient having a coefficient value one greater than the value associated with the coefficient with an occurrence value of zero.

21. A tangible computer-readable medium having stored thereon computer-executable instructions comprising:
instructions for applying a wavelet transform to at least a portion of a digital object to produce a plurality of wavelet transform coefficients;
instructions for generating digital information indicative of a histogram of occurrences of values based on the plurality of wavelet transform coefficients;

instructions for performing a histogram shift operation of the occurrences of at least a first contiguous plurality of the values of the histogram indicative digital information without performing a histogram shift operation of the occurrences of at least a second contiguous plurality of the values of the histogram indicative digital information, wherein each of the coefficient values of the at least a first contiguous plurality are less than each of the coefficient values of the at least a second contiguous plurality; and instructions for embedding data into the plurality of wavelet transform coefficients.

22. The medium of claim 21, wherein the instructions for applying a wavelet transform to at least a portion of a digital object comprise instructions for applying a wavelet transform to at least a portion of a digital image.

23. The medium of claim 22, wherein the instructions for applying a wavelet transform to at least a portion of the digital image comprise instructions for applying a two-dimensional wavelet transform to the at least a portion of the digital image.

24. The medium of claim 23, wherein the instructions for applying a two-dimensional wavelet transform to at least a portion of the digital image comprise instructions for applying the two-dimensional wavelet transform to a plane of the digital image.

25. The medium of claim 24, wherein the instructions for applying the two-dimensional wavelet transform to a plane of the digital image comprise instructions for applying the two-dimensional wavelet transform to a luminosity plane of the digital image.

26. The medium of claim 24, wherein the instructions for applying the two-dimensional wavelet transform to a plane of the digital image comprise instructions for applying the two-dimensional wavelet transform to at least one of a red, green and blue color plane of the digital image.

27. The medium of claim 22, wherein the digital image comprises a frame of a digital video file.

28. The medium of claim 21, wherein the digital object comprises an audio file.

29. The medium of claim 21, wherein the instructions for applying a wavelet transform to at least a portion of a digital object comprise instructions for applying an integer wavelet transform.

30. The medium of claim 29, wherein the instructions for applying an integer wavelet transform comprise instructions for applying a Cohen-Daubechies-Feauveau (2,2) wavelet transform.

31. The medium of claim 21, further comprising instructions for performing a histogram narrowing operation.

32. A tangible computer-readable medium having stored thereon computer-executable instructions comprising:

instructions for applying a wavelet transform to at least a portion of a digital object to produce a plurality of wavelet transform coefficients;

instructions for generating digital information indicative of a histogram of occurrences of values based on the plurality of wavelet transform coefficients;

instructions for performing a histogram shift operation of the occurrences of at least a first contiguous plurality of the values of the histogram indicative digital information without performing a histogram shift operation of the occurrences of at least a second contiguous plurality of the values of the histogram indicative digital information; and instructions for embedding data into the plurality of wavelet transform coefficients wherein the instructions for embedding data into the plurality of wavelet transform coefficients comprise:

instructions for scanning the plurality of transform coefficients; and instructions for each coefficient having a coefficient value equal to a value associated with a coefficient adjacent to a coefficient with an occurrence value of zero in the histogram, if a data bit to be embedded comprises a "1", for increasing the coefficient value by one.

33. The medium of claim 32, further comprising instructions, for each coefficient having a coefficient value equal to the value associated with the coefficient adjacent to the coefficient with an occurrence value of zero in the histogram, if a data bit to be embedded comprises a "0", for not increasing the coefficient value.

34. A tangible computer-readable medium having stored thereon computer-executable instructions comprising:

instructions for extracting embedded data from a plurality of wavelet transform coefficients;

instructions for backfilling a gap in a wavelet histogram, wherein the gap is created by performing a histogram shift operation of occurrences of at least a first contiguous plurality of the values of the histogram indicative digital information without performing a histogram shift operation of the occurrences of at least a second contiguous plurality of the values of the histogram indicative digital information, and wherein each of the coefficient values of the at least a first contiguous plurality are less than each of the coefficient values of the at least a second contiguous plurality; and instructions for performing a reverse wavelet transform on the plurality of wavelet transform coefficients to produce data for at least a portion of a digital object.

35. The medium of claim 34, wherein the instructions for performing a reverse wavelet transform on the plurality of wavelet transform coefficients to produce data for at least a portion of a digital object comprise instructions for performing a reverse wavelet transform on the plurality of wavelet transform coefficients to produce data for at least a portion of a digital image.

36. The medium of claim 35, wherein the instructions for performing a reverse wavelet transform on the plurality of wavelet transform coefficients to produce data for at least a portion of the digital image comprise instructions for performing a reverse wavelet transform on the plurality of wavelet transform coefficients to produce data for a frame of a digital video file.

37. The medium of claim 34, wherein the instructions for performing a reverse wavelet transform on the plurality of wavelet transform coefficients to produce data for at least a portion of a digital object comprise instructions for performing a reverse wavelet transform on the plurality of wavelet transform coefficients to produce data for at least a portion of a plane of a digital image.

38. The medium of claim 34, wherein the instructions for performing a reverse wavelet transform on the plurality of wavelet transform coefficients to produce data for at least a portion of a digital object comprise instructions for performing a reverse wavelet transform on the plurality of wavelet transform coefficients to produce data for at least a portion of an audio file.

39. The medium of claim 34, wherein the instructions for performing an inverse wavelet transform comprise instructions for performing an inverse Cohen-Daubechies-Feauveau (2,2) wavelet transform.

40. A tangible computer-readable medium having stored thereon computer-executable instructions comprising:
- instructions for extracting embedded data from a plurality of wavelet transform coefficients;
- instructions for backfilling a gap in a wavelet histogram; and
- instructions for performing a reverse wavelet transform on the plurality of wavelet transform coefficients using a computing platform to produce data for at least a portion of a digital object, wherein extracting embedded data from the plurality of wavelet transform coefficients comprises:
  - instructions for decoding a bit with a value of zero for a coefficient having a coefficient value equal to a value associated with a coefficient with an occurrence value of zero in the histogram; and
  - instructions for decoding a bit with a value of one for a coefficient having a coefficient value one greater than the value associated with the coefficient with an occurrence value of zero.

41. An apparatus, comprising:
- means for applying a wavelet transform to at least a portion of a digital object to produce a plurality of wavelet transform coefficients;
- means for generating digital information indicative of a histogram of occurrences of values based on the plurality of wavelet transform coefficients;
- means for performing a histogram shift operation of the occurrences of at least a first contiguous plurality of the values of the histogram indicative digital information without performing a histogram shift operation of the occurrences of at least a second contiguous plurality of the values of the histogram indicative digital information, wherein each of the coefficient values of the at least a first contiguous plurality are less than each of the coefficient values of the at least a second contiguous plurality; and
- means for embedding data into the plurality of wavelet transform coefficients using a computing platform.

42. The apparatus of claim 41, wherein the means for applying a wavelet transform to at least a portion of a digital object comprises means for applying a wavelet transform to at least a portion of a digital image.

43. The apparatus of claim 42, wherein the means for applying a wavelet transform to at least a portion of the digital image comprises means for applying a two-dimensional wavelet transform to the at least a portion of the digital image.

44. The apparatus of claim 43, wherein the means for applying a two-dimensional wavelet transform to at least a portion of the digital image comprises means for applying the two-dimensional wavelet transform to a plane of the digital image.

45. The apparatus of claim 44, wherein the plane of the digital image comprises a luminosity plane.

46. The apparatus of claim 44, wherein the plane of the digital image comprises a red, green, or blue color plane.

47. The apparatus of claim 42, wherein the digital image comprises a frame of a digital video file.

48. The apparatus of claim 41, wherein the digital object comprises an audio file.

49. The apparatus of claim 41, wherein the means for applying a wavelet transform to at least a portion of a digital object comprises means for applying an integer wavelet transform.

50. The apparatus of claim 49, wherein the means for applying an integer wavelet transform comprises means for applying a Cohen-Daubechies-Feauveau (2,2) wavelet transform.

51. The apparatus of claim 41, further comprising means for performing a histogram narrowing operation.

52. An apparatus comprising:
- means for applying a wavelet transform to at least a portion of a digital object to produce a plurality of wavelet transform coefficients;
- means for generating digital information indicative of a histogram of occurrences of values based on the plurality of wavelet transform coefficients;
- means for performing a histogram shift operation of the occurrences of at least a first contiguous plurality of the values of the histogram indicative digital information relative the occurrences of at least a second contiguous plurality of the values of the histogram indicative digital information; and
- means for embedding data into the plurality of wavelet transform coefficients using a computing platform-wherein the means for embedding data into the plurality of wavelet transform coefficients comprises:
  - means for scanning the plurality of transform coefficients; and
  - means for increasing the coefficient value by one and for each coefficient having a coefficient value equal to a value associated with a coefficient adjacent to a coefficient with an occurrence value of zero in the histogram, if a data bit to be embedded comprises a "1".

53. The apparatus of claim 52, wherein for each coefficient having a coefficient value equal to the value associated with the coefficient adjacent to the coefficient with an occurrence value of zero in the histogram, if a data bit to be embedded comprises a "0", the coefficient value is not increased.

54. An apparatus, comprising:
- means for extracting embedded data from a plurality of wavelet transform coefficients;
- means for backfilling a gap in a wavelet histogram, wherein the gap is created by performing a histogram shift operation of occurrences of at least a first contiguous plurality of the values of the histogram indicative digital information without performing a histogram shift operation of the occurrences of at least a second contiguous plurality of the values of the histogram indicative digital information, and wherein each of the coefficient values of the at least a first contiguous plurality are less than each of the coefficient values of the at least a second contiguous plurality; and
- means for performing a reverse wavelet transform on the plurality of wavelet transform coefficients using a computing platform to produce data for at least a portion of a digital object.

55. The apparatus of claim 54, wherein the digital object comprises a digital image.

56. The apparatus of claim 55, wherein the digital image comprises a frame of a digital video file.

57. The apparatus of claim 54, wherein the at least a portion of a digital object comprises a plane of a digital image.

58. The apparatus of claim 54, wherein the digital object comprises an audio file.

59. The apparatus of claim 54, wherein the means for performing an inverse wavelet transform comprises means for performing an inverse Cohen-Daubechies-Feauveau (2,2) wavelet transform.

60. An apparatus comprising:
means for extracting embedded data from a plurality of wavelet transform coefficients;
means for backfilling a gap in a wavelet histogram; and
performing a reverse wavelet transform on the plurality of wavelet transform coefficients using a computing platform to produce data for at least a portion of a digital object,
wherein the means for extracting embedded data from the plurality of wavelet transform coefficients comprises:
means for decoding a bit with a value of zero for a coefficient having a coefficient value equal to a value associated with a coefficient with an occurrence value of zero in the histogram; and
means for decoding a bit with a value of one for a coefficient having a coefficient value one greater than the value associated with the coefficient with an occurrence value of zero.

\* \* \* \* \*

UNITED STATES PATENT AND TRADEMARK OFFICE
CERTIFICATE OF CORRECTION

PATENT NO.        : 8,260,065 B2
APPLICATION NO.   : 11/418821
DATED             : September 4, 2012
INVENTOR(S)       : Shi et al.

It is certified that error appears in the above-identified patent and that said Letters Patent is hereby corrected as shown below:

On the Title Page, Item (56), under "OTHER PUBLICATIONS", Line 1, delete "al" and insert -- al., --, therefor.

On the Title Page, Item (56), under "OTHER PUBLICATIONS", Line 4, delete "al," and insert -- al., --, therefor.

On the Title Page, Item (56), under "OTHER PUBLICATIONS", Line 7, delete "al," and insert -- al., --, therefor.

In Column 6, Line 65, delete "ration" and insert -- ratio --, therefor.

Signed and Sealed this
Fifth Day of February, 2013

Teresa Stanek Rea
*Acting Director of the United States Patent and Trademark Office*